United States Patent
Gurevich

(10) Patent No.: US 6,840,481 B1
(45) Date of Patent: Jan. 11, 2005

(54) ADJUSTABLE MULTIPOINT DOCKING SYSTEM

(75) Inventor: Leon Gurevich, Rahnco Palos Verdes, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 10/675,754

(22) Filed: Sep. 30, 2003

(51) Int. Cl.$^7$ .................................................. B64G 1/64
(52) U.S. Cl. ....................................................... 244/161
(58) Field of Search ................................. 244/161, 115, 244/116; 294/86.4, 106; 269/111, 115, 152, 155, 242, 244; 901/30–32, 35–39, 46, 50

(56) References Cited

U.S. PATENT DOCUMENTS

| 3,753,536 | A | * | 8/1973 | White .......................... 244/161 |
| 4,123,020 | A | * | 10/1978 | Korsak ......................... 244/116 |
| 4,177,964 | A | * | 12/1979 | Hujsak et al. ............... 244/161 |
| 4,219,171 | A | * | 8/1980 | Rudmann .................... 244/161 |
| 4,260,187 | A | * | 4/1981 | Frosch et al. ............... 294/86.4 |
| 4,391,423 | A | * | 7/1983 | Pruett et al. ................. 244/161 |
| 4,718,709 | A | * | 1/1988 | Myers et al. ................ 294/106 |
| 4,929,011 | A | * | 5/1990 | Vandersluis et al. ........ 294/86.4 |

* cited by examiner

Primary Examiner—Galen Barefoot
(74) Attorney, Agent, or Firm—Derrick Michael Reid

(57) ABSTRACT

An adjustable multipoint docking system includes a plurality of adjustable grasping jaws that are aligned on a mounting surface and adapted to grab onto a wide variety of extending rings, such as conventional spacecraft adapter rings, of an on-orbit target spacecraft for various missions including spacecraft rescue, spacecraft transorbiting to a desired orbit, spacecraft transorbiting to a waste orbit, or spacecraft deorbiting.

13 Claims, 3 Drawing Sheets

MOUNTED DOCKING SYSTEM

DOCKING ASSEMBLY

DOCKING SYSTEM (TOP VIEW)

DOCKING SYSTEM (SIDE VIEW)

MOUNTED DOCKING SYSTEM

US 6,840,481 B1

ADJUSTABLE MULTIPOINT DOCKING SYSTEM

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of spacecraft docking mechanisms. More particularly, the present invention relates to universal spacecraft docking systems.

BACKGROUND OF THE INVENTION

Current practice of launching a satellite into space includes a launch vehicle and the attached satellite. The satellite, such as a Defense Meteorological Satellite Program satellite, a Global Positioning System satellite, or a Defense Satellite Communications System satellite includes an extending adapter ring for coupling the satellite to the launch vehicle. The launch vehicle also has a mating circular adapter ring. Both the launch vehicle and the satellite adapter rings have a circular extending cylinder at the distal end of which is a small horizontal or angularly extending flange. A metal band that is known as a marman clamp is fastened around both of the small extending flanges so as to rigidly couple the satellite to the launch vehicle. Once the launch vehicle has reached the designated release point during launch, the clamp is released and the satellite departs from the launch vehicle.

In some situations, the orbiting satellite may require servicing, such that there is a need to dock a repair vehicle to the satellite. Typical recovery missions would include boosting a satellite from a wrong orbit, moving dead satellites out of valuable orbital slots, rescuing personnel in a deorbiting space station, among others missions. A recovery vehicle can attach to the satellite by means of a docking mechanism. While many docking mechanisms have been designed in the past, none are known to have a multi-mission capability. All docking mechanisms to date have been designed to work in tandem with an appropriately designed docking interface on the target satellite. That is, both vehicles need to be equipped with custom docking interfaces to couple the vehicles together. However, most satellites that are already on-orbit, as well as most satellites currently under development, lack any docking interfaces whatsoever. Therefore, current docking mechanisms do not function with most existing and near term satellite systems. As such, there is no universal docking mechanism available for most types of satellites, including those with circular adapter rings. These and other disadvantages are solved or reduced using the invention.

SUMMARY OF THE INVENTION

An object of the invention is to provide a docking system for grabbing onto a spacecraft.

Another object of the invention is to provide a docking system for grabbing onto a spacecraft having extending flanges.

Yet another object of the invention is to provide a docking system having opening and closing jaws for grabbing onto a spacecraft having extending circular adapter rings.

Still another object of the invention is to provide a docking system for grabbing onto a spacecraft having extending circular adapter rings at the distal end of which is a lip suitable for mechanical grabbing.

Yet another object of the invention is to provide a docking system for grabbing onto a spacecraft having an extending circular adapter ring at the distal end of which is a small horizontal extending flange suitable for mechanical grabbing.

A further object of the invention is to provide a docking system for grabbing onto an extending circular adapter ring of a spacecraft at multiple positions about the ring.

The invention is directed to a docking mechanism that can be used to grasp a variety of satellites having extending flanges. The mechanism is an adjustable docking mechanism that can be used on a rescue vehicle to grasp orbiting satellites and space objects. In the preferred form, the mechanism includes a plurality of opening and closing jaws that are radially adjustable to grasp the adapter rings at a wide variety of respective circumferential positions about the rings. The docking mechanism consists of adjustable jaws that can be commanded to be positioned so as to grasp the target vehicle. Preferably, the capture vehicle includes a circular mounting plate on which is disposed a plurality of docking assemblies angularly disposed about the plate so as to grasp the adapter ring in a respective plurality of circumferential angular positions. After grasping the adapter ring, the mechanism will preload the ring against the rescue vehicle. The adjustability in position to fit the diameter size and respective angular positions of the adapter ring enable the mechanism to be used for docking to variety of target vehicles, including those not originally designed for docking. As such, a capture vehicle equipped with the docking mechanism can dock to a variety of orbiting satellites for enhanced service and transorbiting of the satellites. These and other advantages will become more apparent from the following detailed description of the preferred embodiment.

DETAILED DESCRIPTION OF THE PREFERRED EMBODIMENT

Figure 1:
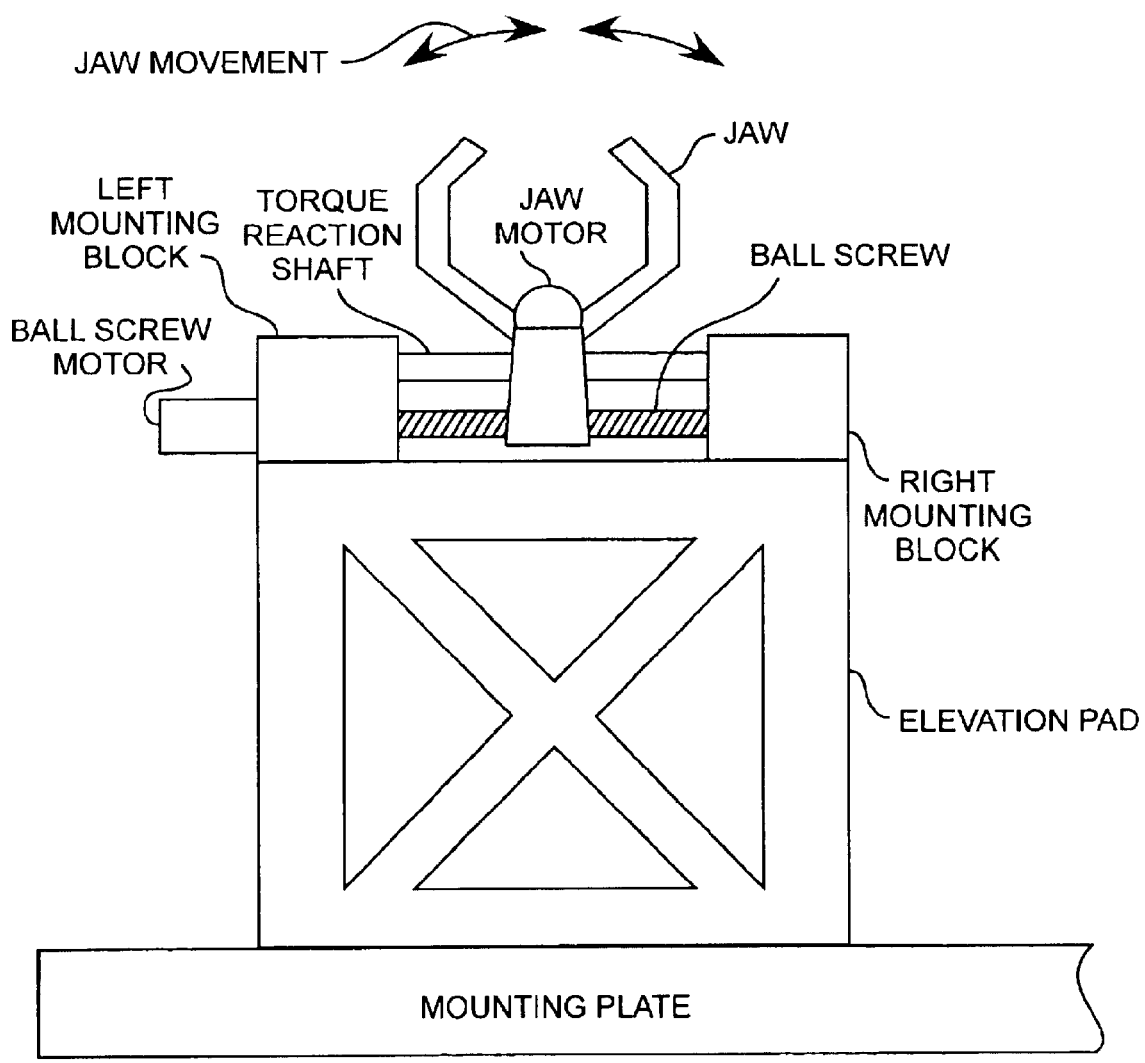
FIG. 1 depicts a docking assembly.

An embodiment of the invention is described with reference to the figures using reference designations as shown in the figures. Referring to FIG. 1, a docking assembly includes a jaw that is opened and closed by a jaw motor that is, in turn, positioned between a left mounting block and a right mounting block using a ball screw driven by a ball screw motor. The jaw is further slidable, coupled to a torque reaction shaft for maintaining the jaw in an upright position. The left and right mounting blocks are attached to an elevation pad that is, in turn, attached to a mounting plate. The elevation pad serves to position the moving jaw assembly well above the mounting plate.

Figure 2A:
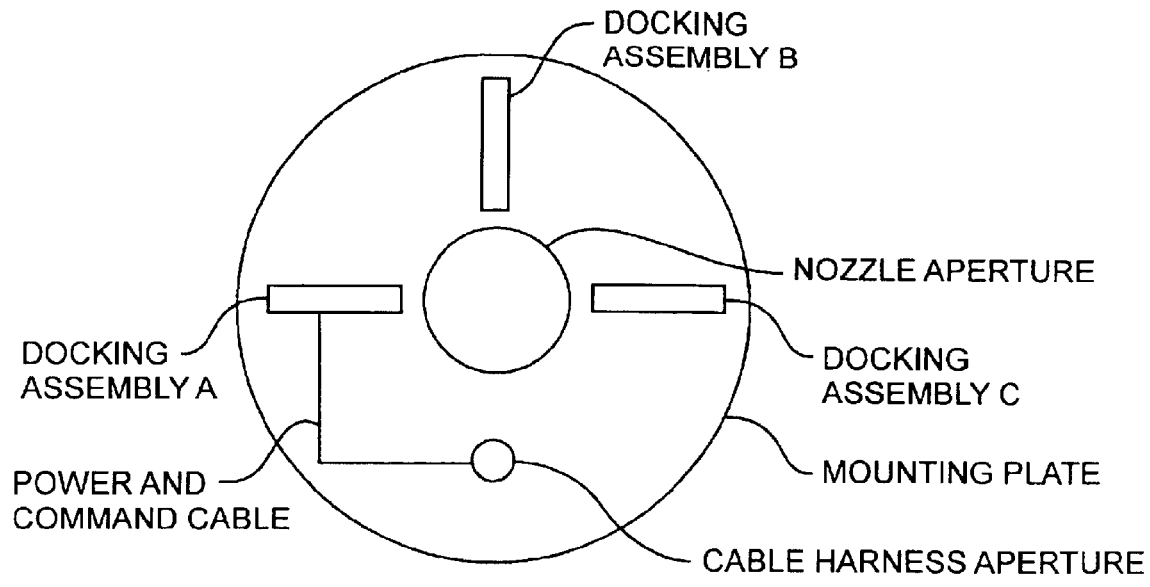
FIG. 2A depicts a docking system from a top view.
Figure 2B:
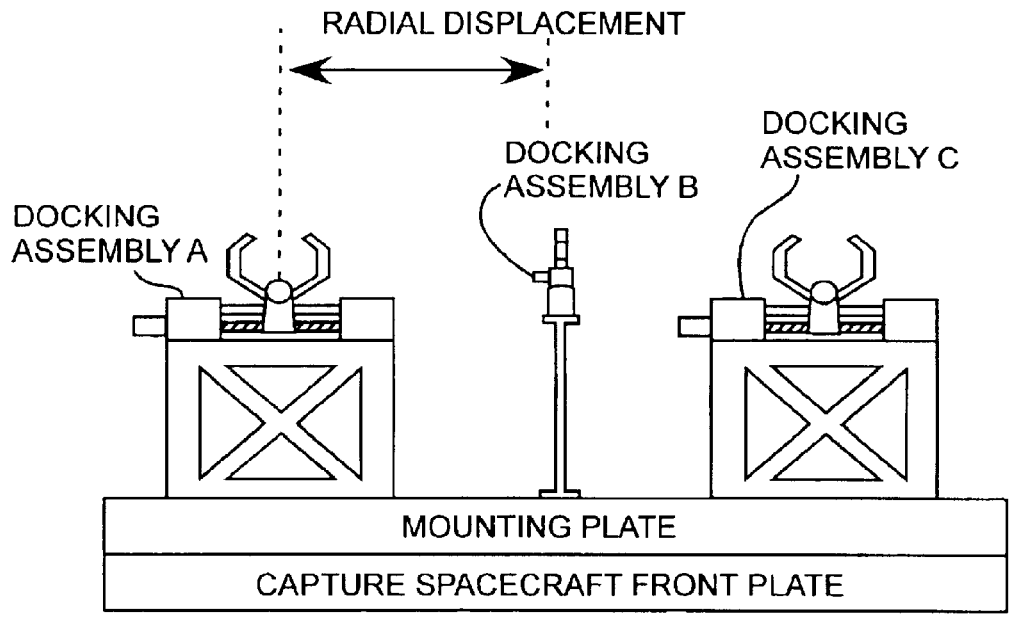
FIG. 2B depicts the docking system coupled to a capture spacecraft from a side view.

Referring to FIGS. 1, 2A, and 2B, a plurality of docking assemblies are attached to the mounting plate. In the preferred form, three assemblies are angularly positioned at zero, ninety, and one hundred eighty degrees about the circular mounting plate. This positioning allows capture of satellites with both circular and rectangular adapters. As such, preferably three respective jaws are resultantly so positioned on, but elevated from, the circular mounting plate. Three docking assemblies are used because the use of only two docking assemblies would not provide sufficient stability after docking. Four or more docking assemblies would provide increased stability after docking but with unnecessary complexity. Hence, three docking assemblies are preferred, because they provide the optimal balance between stability and reduced complexity. These docking assemblies could be placed at equiangular positions about the mounting plate. The mounting plate is preferably circular and can be attached to the front end of a capture spacecraft. Alternatively, the front end could be an adapter ring of the capture vehicle. Being angularly disposed about the circular mounting ring, the jaws are adjusted by the ball screw motors to a desired radial position between the left and right mounting blocks. The jaws are preferably mounted on sliding blocks that are moved by ball screws to the required positions, but other repositioning means could be used such as belts, gears, and cables, driven by stepper or other torque motors. The ball screws are preferably rotated by means of electric motors. Torque reaction shafts keep the sliding blocks properly aligned. Three compression pads, not shown, rotate into position against the adapter ring after the jaws have grasped the target satellite and are used to preload the target satellite against the capture vehicle. The compression pads are used to generate a preload force between the jaws and the target spacecraft adapter ring. One compression pad may be used with each docking assembly. After the jaws grasp the adapter ring, the compression pads are activated to push against the bottom of the adapter ring. As the pads push against the bottom of the ring, the jaws react to that force, and a preload is generated to secure the adapter ring. This preload is needed to provide a stiff loading path between the two spacecraft. The compression pads are well known by those skilled in the art.

The jaw motors and adjusting ball screw motors receive power and command through a power and command cable extending to all of the motors through a cable harness aprture leading to capturing spacecraft's front panel. The three jaw assemblies are mounted on elevation pads that are designed to provide clearance between the front end of the capture satellite and possible protrusions on the aft end of the target satellite, such as batteries, antennas, or engine nozzles. The entire docking mechanism assembly is mounted onto the mounting plate on the front end of the rescue vehicle.

Figure 3:
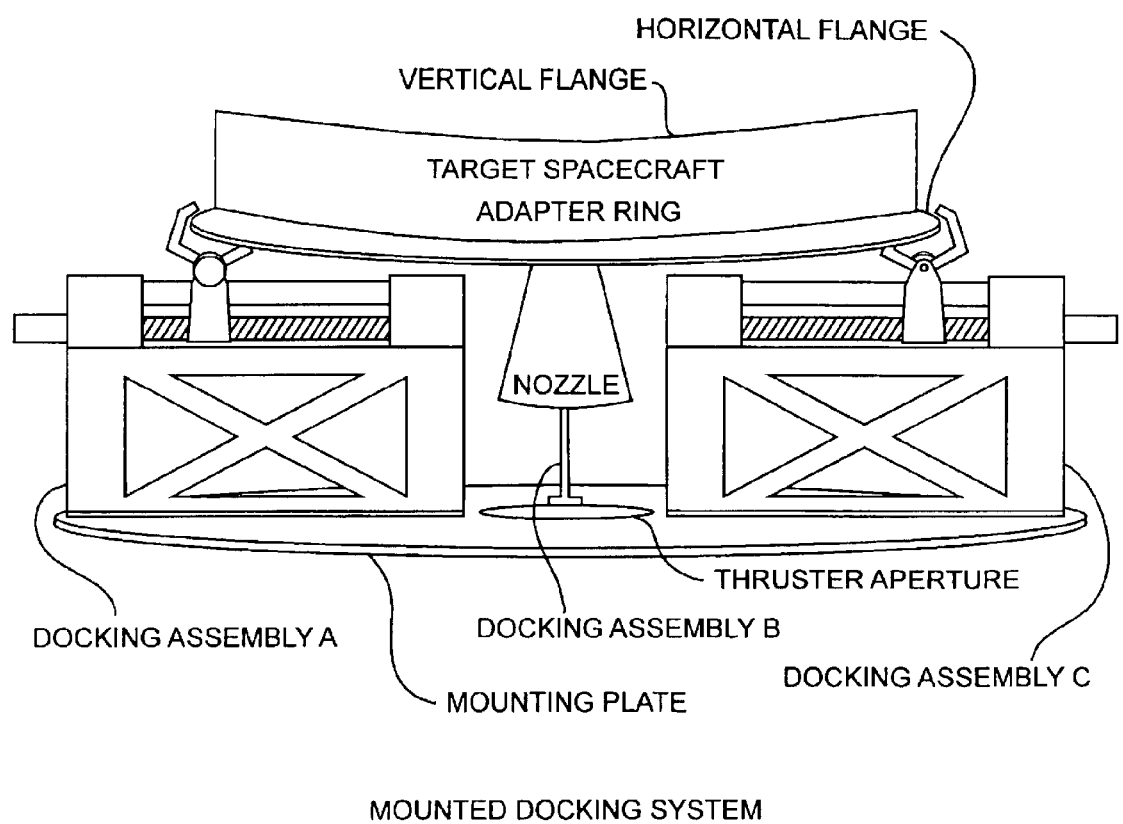
FIG. 3 depicts a mounted docking system for docking to a target spacecraft.

Referring to all of the figures, and more particularly to FIG. 3, a mounted docking system is shown with the jaws grasping a target spacecraft adapter ring that conventionally includes a vertical ring and a small horizontal flange. The horizontal flange is relatively small, but being orthogonal to the vertical ring, enables secure grasping by the jaws. The jaws are radially adjusted so as to be aligned to the adapter ring and are then closed to grab the adapter ring, after the capture vehicle has approached the adapter ring at the same relative velocity and near position.

It should now be apparent that the docking mechanism is well suited for docking to conventional adapter rings. The adjustable multipoint docking mechanism is preferably used on the front end of the rescue capture spacecraft vehicle. The rescue vehicle will be responsible for approaching the target satellite, and achieving the required proximity within which the docking mechanism is designed to grasp the target satellite. In the preferred form, the docking mechanism consists of three adjustable jaws, which are operated individually by electric motors, but other means could be used, such as through the use of rectangular adapter flanges with non-radial positioning of the docking assemblies. The jaws can be used to grasp both rectangular interfaces, circular interfaces, and irregular interfaces, so long as the flanges are extending from the target vehicle. Preferably the flanges will have small orthogonal or angular flanges for secured grabbing of the interface flange.

The invention is characterized as having one degree of freedom for each jaw that combines the functions of a robot arm. The docking mechanism consists of adjustable jaws that can be repositioned to grasp the target vehicle of interest. In most cases, the jaws would grasp the adapter ring. After grasping the interface, the mechanism will preload the ring against the rescue vehicle, and rescue operations can proceed. The adjustability of the jaws enables the docking mechanism to be utilized for a variety of target vehicles, including those not originally designed for docking. The system can be used for on-orbit servicing of satellites, to reboost spacecraft from improper orbits, to salvage perfectly good satellites, to reposition dead satellites at end of life, to remove debris from a particular orbit. Those skilled in the art can make enhancements, improvements, and modifications to the invention, and these enhancements, improvements, and modifications may nonetheless fall within the spirit and scope of the following claims.

What is claimed is:

1. A system for docking a capture spacecraft to a target spacecraft having an extending adapter, the system comprising,
   jaws for grasping onto the extending adapter at respective positions about the adapter,
   jaw motors respectively for opening and closing the jaws for grabbing the extending adapter at the respective positions about the adapter,
   adjusting motors for moving the jaws relative to each other for placing the jaws at the respective positions, the adjusting motors operating independently from the jaw motors for positioning the jaws to any of the respective positions prior to closing the jaws, and
   mounting plate for supporting jaws, jaw motors, and adjusting motors.

2. The system of claim 1 wherein,
   each of the jaws, respective motors, and adjusting motors are integrated together into an assembly.

3. The system of claim 1 wherein,
   each one of the jaws, respective jaw motors, and respective adjusting motors are integrated together into an assembly further comprising an elevation pad for separating in distance the jaws, jaw motors, and adjusting motors from the mounting plate.

4. The system of claim 1 wherein, the extending adapter is an adapter ring.

5. The system of claim 1 wherein,
   the extending adapter is an adapter ring comprising:
   a vertical extending circular ring; and
   a lip at a distal end of the extending circular ring, the jaws serving to grab the lip at the respective positions that are respective angular positions circumferentially about the lip.

6. The system of claim 1 wherein,
   the extending adapter is an adapter ring comprising:
   a vertical extending circular ring; and
   a lip at a distal end of the extending circular ring, the lip being a horizontal extending flange, the jaws serving to grab the lip at the respective positions that are respective angular positions circumferentially about the lip.

7. The system of claim 1 wherein, the extending adapter is an adapter ring comprising:
- a vertical extending circular ring; and
- a lip at a distal end of the extending circular ring, the lip being a horizontal extending flange, the jaws serving to grab the lip at the respective positions that are respective angular positions circumferentially about the lip, the target spacecraft is a satellite with a circular adapter ring.

8. The system of claim 1 wherein, the extending adapter is an adapter ring comprising:
- a vertical extending circular ring; and
- a lip at a distal end of the extending circular ring, the lip being a horizontal extending flange, the jaws serving to grab the lip at the respective positions that are respective angular positions circumferentially about the lip, the target spacecraft is a satellite with a rectangular adapter.

9. The system of claim 1 wherein, the target spacecraft includes a rocket nozzle extending within the extending adapter, and the mounting plate comprises a nozzle aperture for receiving the rocket nozzle.

10. The system of claim 1 wherein, the jaw motors are individual motors.

11. The system of claim 1 wherein, the adjusting motors move the jaws radially relative to the mounting plate.

12. The system of claim 1 wherein, there are three adjusting motors that are radially deposed and radially move about the mounting plate at unequiangular positions.

13. The system of claim 1 wherein, the adjusting motors are three adjusting motors that are radially deposed and radially move about the mounting plate at unequiangular 90°, 180° and 270° radial positions.

* * * * *